US006237313B1

(12) United States Patent
Leden

(10) Patent No.: US 6,237,313 B1
(45) Date of Patent: May 29, 2001

(54) GRASS CATCHER SUPPORT ASSEMBLY FOR REEL MOWER CUTTING UNIT

(75) Inventor: Nathan M. Leden, Cary, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/374,578

(22) Filed: Aug. 13, 1999

(51) Int. Cl.[7] .......................... A01D 34/13; A01D 34/52; A01D 34/73; A01D 43/00; A01D 43/06

(52) U.S. Cl. ..................................... 56/199; 56/7

(58) Field of Search ................................ 56/7, 199, 249, 56/6, 294, 253

(56) References Cited

U.S. PATENT DOCUMENTS

| Re. 34,921 | 5/1995 | Lamusga et al. ............... 56/7 |
|---|---|---|
| 2,598,382 | 5/1952 | Holden ...................... 56/199 |
| 3,429,110 | 2/1969 | Straswl ....................... 56/7 |
| 3,514,926 | 6/1970 | Heth et al. ..................... 56/7 |
| 3,624,988 * | 12/1971 | Aldred ......................... 56/7 |
| 4,191,007 * | 3/1980 | Check et al. ............... 56/199 |
| 4,747,258 | 5/1988 | Martinez .................... 56/199 |
| 4,769,976 * | 9/1988 | Bassett et al. ................ 56/7 |
| 4,924,664 | 5/1990 | Ehn, Jr. et al. ............. 56/202 |
| 5,142,852 * | 9/1992 | Nelson ..................... 56/16.6 |
| 5,228,277 | 6/1993 | Smith et al. ............... 56/16.9 |
| 5,293,729 | 3/1994 | Curry et al. ................... 56/7 |
| 5,343,680 | 9/1994 | Reichen et al. ............. 56/249 |
| 5,412,931 | 5/1995 | Reichen et al. ............. 56/199 |
| 5,459,984 | 10/1995 | Reichen et al. ............... 56/7 |
| 5,533,326 | 7/1996 | Goman et al. ................. 56/7 |
| 5,623,817 | 4/1997 | Bricko et al. ................. 56/7 |
| 5,628,169 | 5/1997 | Stiller et al. .................. 56/7 |
| 5,970,690 * | 10/1999 | Toman ........................ 56/7 |
| 6,044,631 * | 4/2000 | Anderson et al. ............. 56/7 |

FOREIGN PATENT DOCUMENTS

WO 93/12641   7/1993  (WO).

OTHER PUBLICATIONS

John Deere, Walking Greens Mowers, 4 pages, published 1999 in U.S.A.
John Deere, 220A/2243 Greens Mowers, pp. 1,4–5 and 7, published 1998 in U.S.A.
John Deere 2500 Professional Greensmower Operators Manual, cover, table of contents and pp. 33–52, published 1998 in U.S.A.
John Deere Parts Catalog–2500 Greensmower, cover and pp. A2 and 112–124, published Jan. 21, 1999 in U.S.A.
John Deere Operator's Manual 3325 Professional Turf Mower, cover and pp. 1 and 117, published Dec. 1990 in U.S.A.
John Deere Operator's Manual 2243 Professional Greensmower, cover and pp. 1 and 29, published Mar. 1990 in U.S.A.

* cited by examiner

Primary Examiner—Thomas B. Will
Assistant Examiner—Arpad Fabian Kovacs

(57) ABSTRACT

An assembly is provided for supporting a clippings collection container for collecting grass clippings cut by a cutting unit carried on a mowing vehicle. The assembly includes a laterally extending member operatively coupled to the cutting unit for movement therewith. The laterally extending member is supported on a lift arm of the vehicle for movement with respect thereto. A container such as a basket is positioned adjacent the cutting unit for receiving clippings cut by the cutting unit. First and second laterally spaced engagement members are coupled with the container for engaging the laterally extending member to couple the container to the cutting unit. The engagement members are secured to the laterally extending member for providing movement of the container with the cutting unit and independent from the lift arm.

14 Claims, 4 Drawing Sheets

GRASS CATCHER SUPPORT ASSEMBLY FOR REEL MOWER CUTTING UNIT

BACKGROUND OF THE INVENTION

1. Field of the Invention

This invention relates generally to removable clippings collection baskets which are attached to reel mower cutting units for receiving grass clippings, and more specifically to support assemblies which couple such baskets to the cutting units.

2. Description of the Related Art

It is known to provide reel mower cutting units with baskets or containers which are positioned adjacent the cutting unit to receive grass clippings. When the basket becomes full of grass clippings the operator will remove or detach the basket from the cutting unit to empty it at a desired location.

Various mechanisms have been provided for attaching or coupling the basket to the cutting unit so that it collects clippings generated by the cutting unit and can be removed for emptying. One such mechanism provides a pair of laterally spaced rods or stingers which are fixed to respective left and right sides of the cutting unit. The basket includes mating openings or slots into which the stingers are received to hold the basket in position. The operator removes a full basket by lifting each side of the basket until the rods or stingers are no longer within the slots. Such baskets are often unsuitable for belly-mounted cutting units as such baskets typically require a great deal of effort for the operator to access the basket such that he can grasp each side of the basket to lift and remove it from the stingers. The stingers are attached to the cutting unit frame so that the weight is supported on the cutting unit. As the basket is filled, the additional weight tends to tip the cutting unit, changing the relationship between the cutting blades and the vegetation being cut so that the cutting height and cutting performance of the cutting unit may be adversely affected.

Another conventional mechanism uses a three piece design consisting of an upper hook, handle, and a lower bail which work together to support the grass catcher. A two-step process is needed to remove the grass catcher. First, the handle must be disconnected from the hook, then the catcher may be lifted out. In this design, the upper hook is bolted to a lift arm, while the lower bail is connected to the cutting unit. As the cutting unit steers, the lower bail moves independently of the upper hook causing them to slide and wear. Because the majority of the weight is transferred to the lift arm and not the cutting unit, the quality and height of cut is not greatly affected. However, mounting the basket to the lift arm allows for disparity in movement of the basket as compared to movement the cutting unit (e.g. when making a turn) creating a gap between them so that clippings are not efficiently collected. Also, the hook and bail protrude in front of the cutting unit, making it easy to catch the structure on other objects, which may damage the mounting structure or the other object.

Other conventional attaching mechanisms include hooks or brackets located at the sides of the basket, and therefore they too make it difficult for an operator to remove a full basket from cutting units positioned beneath a vehicle. These brackets also couple the basket to the cutting unit so that a full basket may affect the cutting height and quality of cut.

Therefore, it would be desirable to provide an attachment assembly for a clippings basket which allows the basket to follow a cutting unit for efficient collection of clippings.

It would also be desirable to provide such a clippings basket which can closely follow the cutting unit while supported on a support structure other than the cutting unit itself, so that the height and quality of cut of the cutting unit is substantially unaffected by additional weight as the basket fills with clippings.

Further, it would be desirable to provide such a basket which may be easily removed and reattached to the reel mower cutting unit, even where the cutting unit is positioned beneath a vehicle.

SUMMARY OF THE INVENTION

The preferred embodiment of the present invention provides an assembly for attaching a clippings collection container to a reel mower cutting unit. A laterally extending member or yoke is fixed to the cutting unit. The yoke, in turn, is coupled at one end to the cutting unit and at another end to a lift arm of the vehicle by a connection which allows some independent movement of the yoke (and the cutting unit), such as the ball joint of the preferred embodiment.

The preferred embodiment new design has two upper support members that are attached to each side of the yoke. The ends of the upper support members also lie on the axis of the ball joint. Two lower support members are pivotably attached to the frame of the cutting unit and are received in slots formed into each side of the catcher. Two adjustable flexible links such as cables or chains extend between the upper and lower support members so that the lower support member will bear only a small percentage of the weight of the catcher. In the preferred embodiment, the upper support members may be attached anywhere on the yoke as long as the ends of the wireforms lie on the axis of the ball joint. The resultant force is then transferred through the axis of the ball joint to the lift arm. Therefore, there are not any resultant forces or moments on the yoke (and passed to the cutting unit) or on the cutting unit directly which would affect the height or quality of cut. The present invention assures that, as the vehicle is steered, the grass catcher moves with the cutting unit. Therefore, no significant gap will exist between the cutting unit and the catcher.

The assembly of the preferred embodiment does not protrude in front of the catcher, reducing the risk that it will be damaged by hitting another object.

In addition, the present invention provides a clean and simple design. To remove the catchers, the operator needs only to lift the catchers from the assembly.

DETAILED DESCRIPTION OF THE PREFERRED EMBODIMENT

Figure 1:
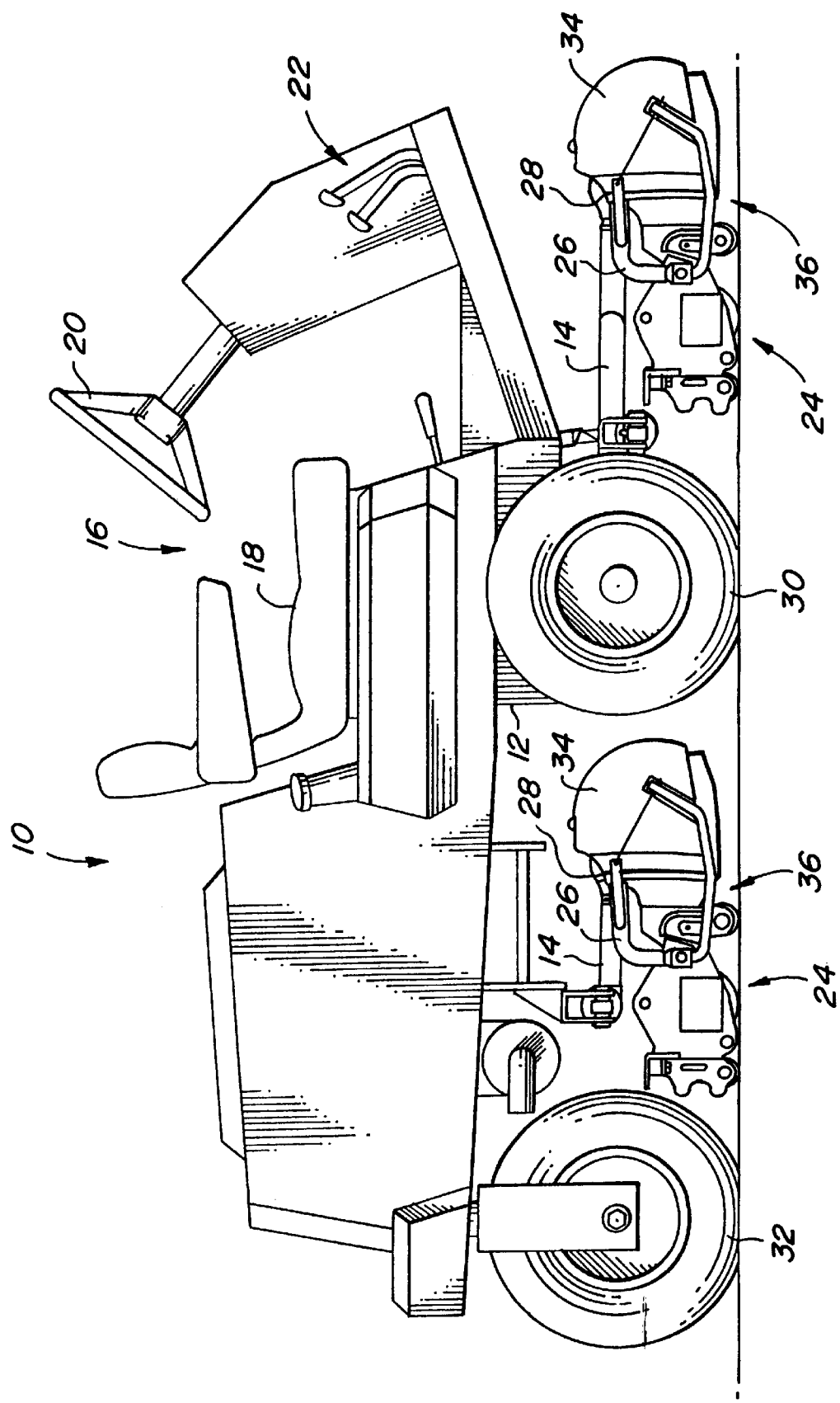
FIG. 1 is an right-side elevational view of a representative mowing vehicle incorporating reel mower cutting units and the preferred embodiment of the grass catcher support assembly of the present invention.

Referring now to FIG. 1, there is shown a vehicle 10 according to the preferred embodiment of the present invention. The vehicle 10 includes a frame 12 from which depend implement lift arms 14. An operator's station 16 which includes a seat 18, a steering wheel and foot controls 22, is operatively positioned on the vehicle 10, and references to left and right in the following description will refer to the operator's left and right when seated on the vehicle 10. Each lift arm 14 carries a reel mower cutting unit 24 on a yoke 26 which is attached to the lift arm 14 at a ball joint 28. A set of cutting units 24 are pulled ahead of the vehicle 10 (the right-side unit visible in FIG. 1), and at least one cutting unit 24 is positioned beneath the vehicle 10 between a front set of wheels 30 and a rear caster wheel 32. Each cutting unit 24 is provided with a clippings collection container in the form of a basket 34 which is positioned in front of the cutting unit 24 and supported by a basket support assembly 36.

Figure 2:
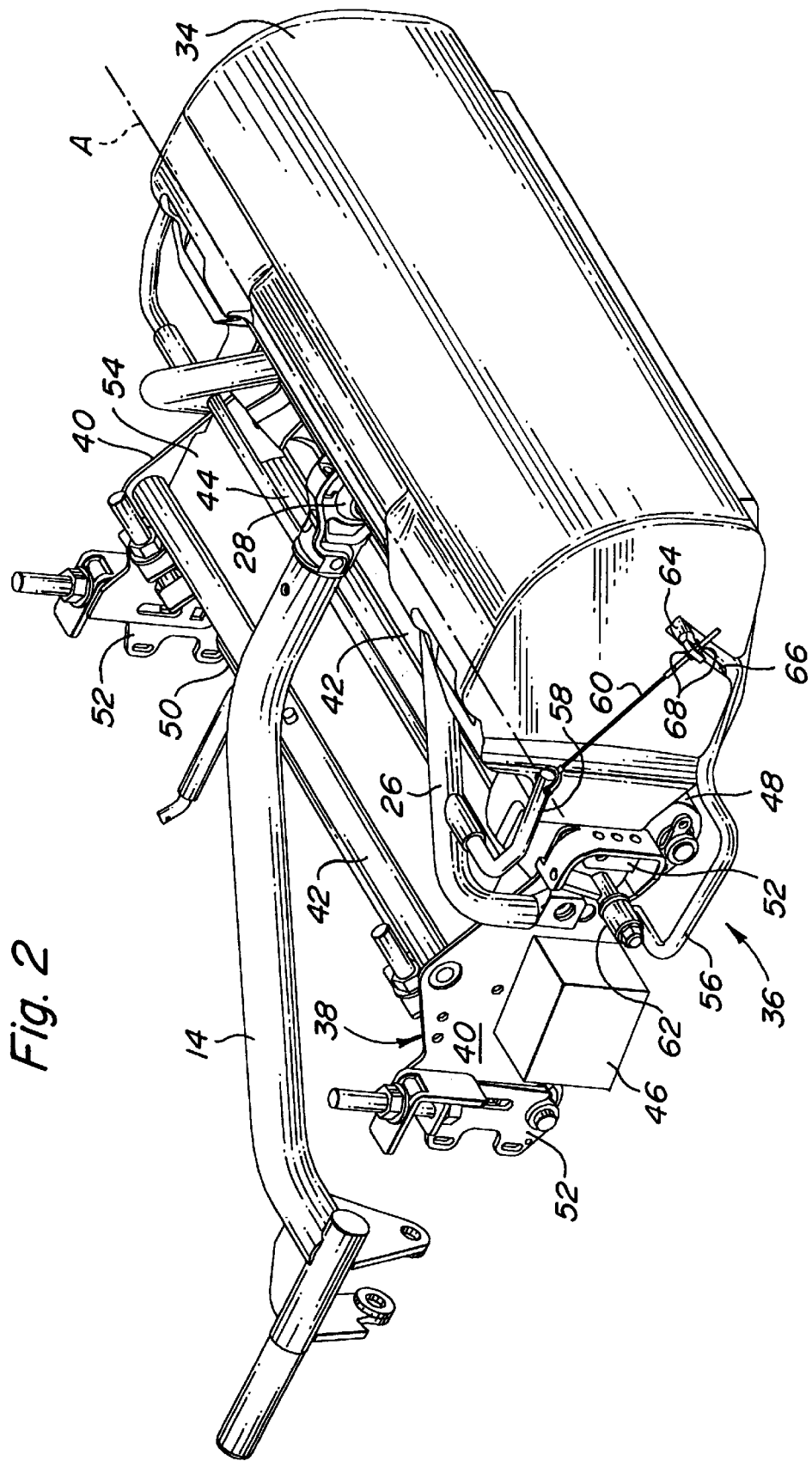
FIG. 2 is a right-side elevated perspective view of a left-hand, front-mounted cutting unit incorporating a grass catcher basket and the grass catcher support assembly of the present invention.

Referring now to FIG. 2, there is shown the left-side cutting unit 24 which is pulled in front of the vehicle 10. The cutting unit 24 includes a frame 38 comprising side frames 40 and laterally extending support bars 42. The frame 38 which supports a cutting reel 44 driven by a motor 46 for rotation about a generally horizontal and laterally extending axis. Front and rear rollers 48 and 50 are coupled to the side frames 40 via attachment brackets 52. The rollers 48 and 50 contact the ground during operation, and can be adjusted up or down to change the cutting height of the cutting unit 24. During operation of the cutting unit 24, grass is cut between rotating reel blades (not shown) of the cutting reel 44 and a bedknife (not shown) mounted between the side frames 40 in a manner known in the art.

Figure 3:
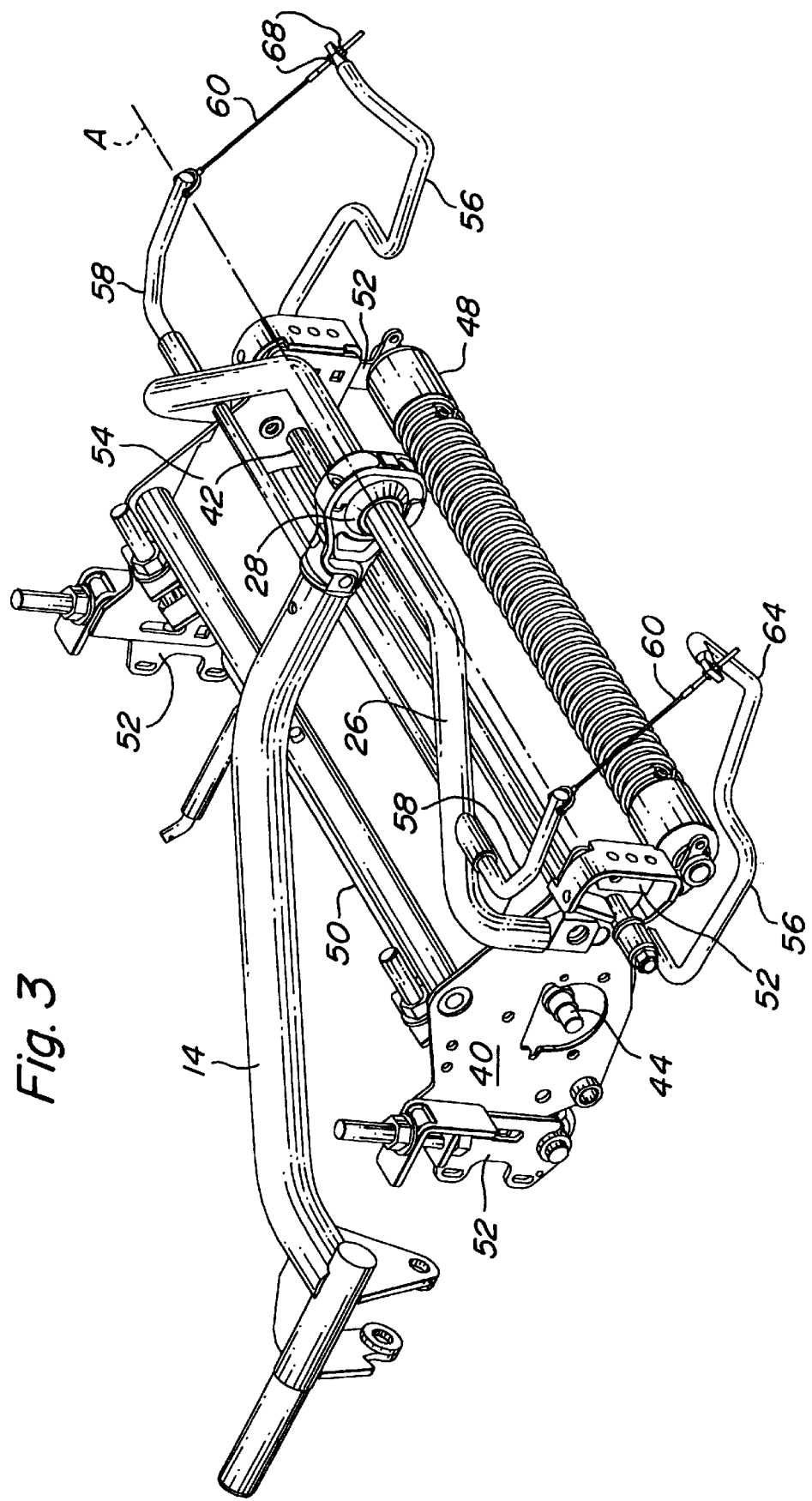
FIG. 3 is a right-side elevated perspective view of the cutting unit of FIG. 2 wherein the basket has been removed.

The grass clippings collection system of the preferred embodiment includes the plastic container or basket 34 which is carried directly in front of and adjacent to the cutting unit 24 for receiving clippings that have been cut by the reel 44. The rotation of the reel 44 propels the clippings against a plate 54 which deflects the clippings forwardly into the basket 34. The support assembly 36 is provided for releasably coupling the basket 24 to the cutting unit 24. End portions of a laterally extending member or yoke 26 are bolted or otherwise fixed to respective sides frames 40 of the cutting unit 24 between the roller attachment brackets 52, as best seen in FIG. 3. The yoke 26, in turn, is connected to an end of the lift arm 14 at the ball joint 28. The cutting unit 24 may therefore be lifted into a transport position and lowered into cutting position by the lift arm 14 while maintaining its ability to follow the contours of the ground and to cut vegetation at a height set by adjustment of the rollers 48, 50.

Figure 4:
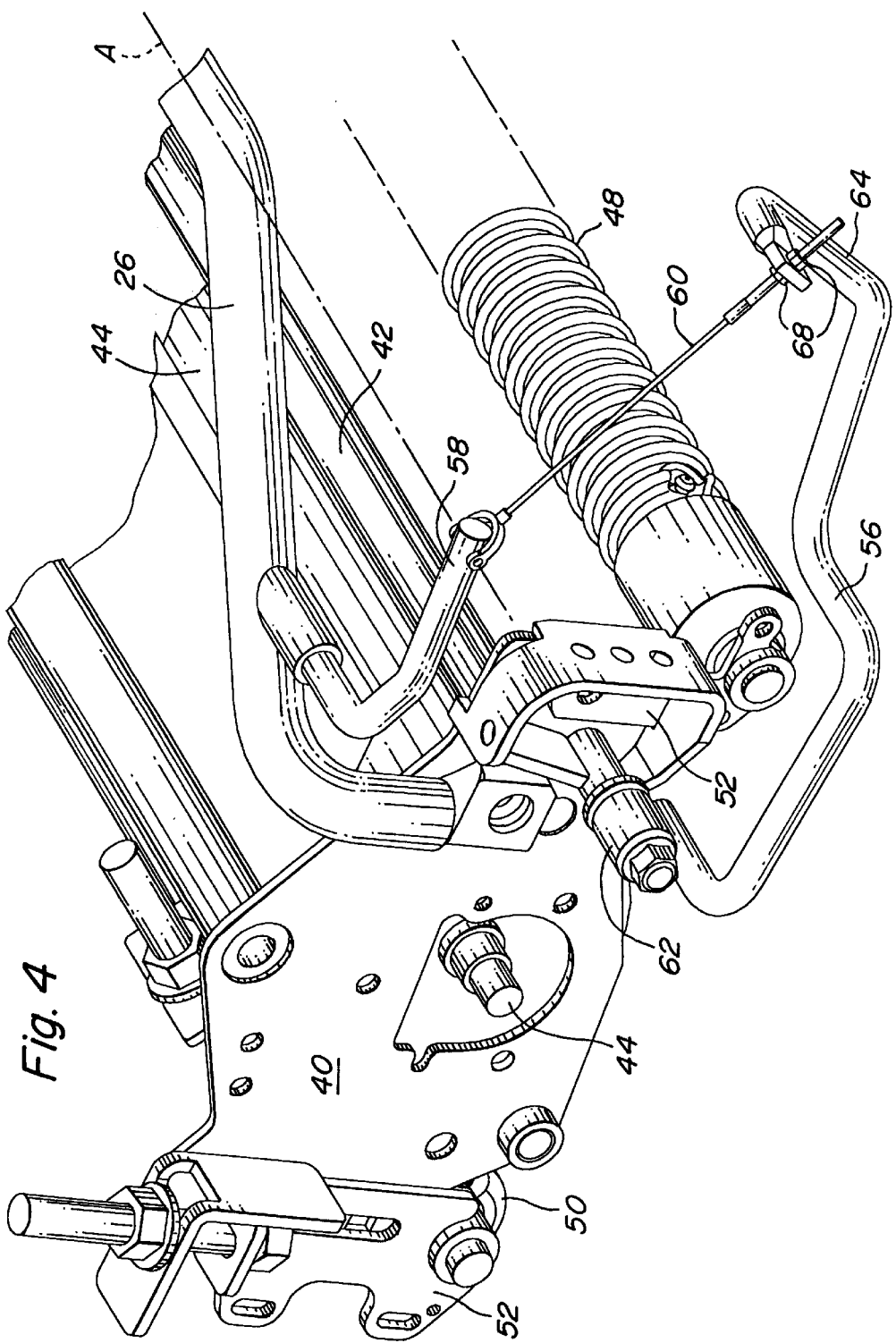
FIG. 4 is an enlarged right-side elevated perspective view of the cutting unit of FIG. 3 showing an inboard portion of the grass catcher support assembly.

FIGS. 2–4 show the support assembly 36 including a lower support member 56, an upper support member 58 and a cable 60 at each side of the cutting unit 24 which cooperate with the yoke 26 and the lift arm 14 to support the basket 34 at a desired position. The components on the inboard side of the cutting unit 24 shown in FIGS. 2–4 will be discussed (their outboard counterparts are mirror images). A tubular end portion 62 of the lower support member 56 is bolted to the side frame 40, and an upturned portion 64 of the lower support member 56 is adapted to be received in a complementary slot 66 formed in the basket 34 so that the lower support member 56 acts as a pivotable bracket for maintaining the basket 34 at a desired attitude with respect to the cutting unit 24. The upper support member 58 is fixed to the yoke 26 (as by welding) and an end portion of the member 58 extends across an axis A of the ball joint 28. The cable 60 is pivotably attached at one end to the end portion of the upper support member 58 and is attached at an opposite, threaded end to the lower support member 56 at an extension of its upturned portion 64. The effective length of the cable 60 is adjustable by adjusting nuts 68 provided at the threaded end of the cable 60.

Since the weight of the basket 34 and its contents are transferred to the lift arm 14 along the axis of the ball joint 28 (FIGS. 2–3), moments tending to tip the cutting unit 24 (and thereby change the effective cutting height) are effectively eliminated while, at the same time, the lower support member and the ball joint 28 allow the basket 34 to maintain a closely adjacent relationship to the cutting unit 24 so that clippings will be efficiently and reliably collected, even as the vehicle 10 is steered. The cable 60 is preferably flexible so that the basket 34 may follow the contour of the ground.

To achieve the advantages described herein, the upper support members 58 may be attached to the yoke 26 at any point so long as the ends of the upper support members 58 (to which force from the lower support members 56 are transferred through the cable 60) lie substantially on the axis A of the ball joint 28. The resultant force is then transferred through the axis A of the ball joint 28 to the lift arm 14. In the preferred embodiment shown in FIGS. 1–4, more than $\frac{2}{3}$ of the weight of the basket 34 will be carried by the lift arm 14 rather than the cutting unit 24. Therefore, The resultant forces and moments are not borne by the yoke 26 or the cutting unit 24 to a degree that they would significantly affect cutting height or quality of cut. The assembly 36 of the preferred embodiment provides a clean design which does not protrude in front of the basket 34, greatly reducing the chance that an operator will accidentally damage the assembly 36 by contacting an object during operation.

Next, the operation of the cutting units 16 will be discussed. During mowing operations grass clippings accumulate in the basket 34. When a baskets 34 at the front of the vehicle 10 has become full the operator can walk to the front of the vehicle 10, and must reach down to remove the basket 34. To remove the basket 34, he simply lifts the basket 34 so that the upturned portions 64 of the lower support member 56 are no longer engaged in the corresponding slots 66 in the basket 34. The preferred embodiment thereby allows the operator of lift the full basket 34 in a single motion.

Once the basket 36 has been emptied, the operator must re-install the basket 36 on the cutting unit 24 before continuing mowing operations. To do so, he can simply slide the basket downward so that the upturned portions 64 of the lower support member 56 are once again engaged in the corresponding slots 66 in the basket 34. When the tops of the upturned portions 64 abut the tops of the slots 66. the baskets are again properly positioned for mowing operations.

In the case of a cutting unit mounted underneath the vehicle 10 and between the wheels 30, 32, the preferred embodiment also allows the operator to stand at the side of the vehicle 10 both for removal of the basket 34 for emptying, and for re-attaching the basket 34. Since the same parts are used in both the front mounted and mid-mounted collection systems, the number of parts is reduced and manufacturing costs are correspondingly reduced.

Although the invention is described with reference to an illustrative embodiment, it will be understood by those skilled in the art that the invention may be advantageous in the form described as modified for use in other applications. For example, the support assembly 36 described above can also be utilized on cutting units that are arranged so that the basket trails the cutting unit during operation. The present invention should not be limited by the above-described embodiments, but should be limited solely by the claims that follow.

We claim:

1. An assembly for supporting a clippings collection container positioned adjacent to a cutting unit of a reel mower that is adapted to be carried on a vehicle, wherein the cutting unit includes spaced apart side walls, said assembly comprising:

a lift arm operably coupled with the vehicle;

a generally u-shaped laterally extending member supported on the lift arm for movement with respect thereto, said laterally extending member having two leg portions with outer end portions, each end portion being operatively coupled to a respective side wall for movement therewith, and first and second laterally spaced engagement members operatively secured to the u-shaped laterally extending member and operatively coupling the container and the cutting unit to provide movement of the container with the cutting unit independent from the lift arm.

2. The assembly of claim 1 wherein the engagement members include lower support members having ends pivotably attached to respective ones of the side walls.

3. The assembly of claim 2 wherein the lower support members have upturned portions which are engageable in complementary slots in the container.

4. The assembly of claim 2 wherein said laterally extending member is generally circular in cross-section.

5. The assembly claim 1 wherein the laterally extending member is coupled to the lift arm at a ball joint.

6. The assembly of claim 5 wherein the ball joint has an axis and wherein the laterally spaced engagement members couple the basket to the laterally extending member at a point on the ball joint axis.

7. An assembly for supporting a clippings collection container positioned adjacent to the cutting unit of a reel mower adapted to be carried on a vehicle, wherein the cutting unit includes spaced apart side walls, said assembly comprising:

a lift arm operably coupled with the vehicle;

a generally u-shaped laterally extending member supported on the lift arm for movement with respect thereto and having two leg portions with outer end portions, each end portion being operatively coupled to a respective side wall for movement therewith, and first and second pairs of laterally spaced upper and lower support members operatively coupled with the container for engaging the laterally extending member to operatively couple the container with the cutting unit, said upper support members being secured to the laterally extending member for providing movement of the container with the cutting unit independent of the lift arm.

8. The assembly of claim 7 wherein the lower support members have upturned portions which are engageable in complementary slots in the container.

9. The assembly of claim 7 wherein the laterally extending member has a generally circular cross-section.

10. The assembly claim 7 wherein the laterally extending member is coupled to the lift arm at a ball joint.

11. An assembly for supporting a clippings collection container positioned adjacent to the cutting unit of a reel mower adapted to be carried on a vehicle, said assembly comprising:

a lift arm operably coupled with the vehicle, said lift arm including a ball joint having an axis extending therethrough;

a laterally extending member operatively coupled with the ball joint for movement with respect thereto and operatively coupled to the cutting unit for movement therewith;

first and second pairs of laterally spaced upper and lower support members operatively coupling the container with the cutting unit, the upper members being operatively coupled with the container at a point on the axis, and cables operatively connecting each respective pair of upper and lower support members to allow movement of the container with the cutting unit independent of the lift arm.

12. The assembly of claim 11 wherein the cables are pivotably coupled to ends of the upper support members at a point on the axis of the ball joint.

13. An assembly for supporting a clippings collection container for collecting grass clippings cut by a cutting unit carried on a mowing vehicle, said assembly comprising:

a lift arm operably coupling the cutting unit to the vehicle;

a laterally extending member operatively coupled to the cutting unit for movement therewith and supported on the lift arm for movement with respect thereto;

a container positioned adjacent the cutting unit for receiving clippings cut by the cutting unit, and first and second laterally spaced upper and lower engagement members operatively coupled with the container for engaging the laterally extending member to operatively couple the container with the cutting unit, said engagement members being secured to the laterally extending member and operatively connected to each other by cables for providing movement of the container with the cutting unit independent from the lift arm.

14. The assembly of claim 13 wherein the ball joint has an axis and the cables are pivotably coupled to ends of the upper support members at a point on the axis of the ball joint.

* * * * *